(12) United States Patent
Sides et al.

(10) Patent No.: US 6,363,449 B1
(45) Date of Patent: Mar. 26, 2002

(54) METHOD AND APPARATUS FOR PROVIDING INTERCHASSIS COMMUNICATION AND MANAGEMENT

(75) Inventors: Chi Kim Sides, Spring; Michael F. Angelo, Houston; Sompong P. Olarig, Cypress, all of TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/280,313

(22) Filed: Mar. 29, 1999

(51) Int. Cl.[7] .......................... G06F 13/00; H04M 11/04
(52) U.S. Cl. ................................. 710/129; 340/310.01
(58) Field of Search ................................. 710/126–132; 340/310.01–310.08

(56) References Cited

U.S. PATENT DOCUMENTS

| | | | |
|---|---|---|---|
| 4,792,731 A | 12/1988 | Pearlman et al. | |
| 5,059,871 A | 10/1991 | Pearlman et al. | |
| 5,144,666 A | 9/1992 | Le Van Suu | |
| 5,352,957 A | 10/1994 | Werner | |
| 5,382,951 A | 1/1995 | White et al. | |
| 5,400,246 A | * 3/1995 | Wilson et al. | 364/146 |
| 5,400,330 A | 3/1995 | Le Van suu | |
| 5,406,248 A | 4/1995 | Le Van Suu | |
| 5,410,292 A | 4/1995 | Le Van Suu | |
| 5,453,738 A | 9/1995 | Zirkl et al. | |
| 5,777,544 A | * 7/1998 | Mey et al. | 340/310.06 |
| 5,805,926 A | 9/1998 | Le Van Suu | |
| 6,173,318 B1 | * 1/2001 | Jackson et al. | 709/219 |
| 6,199,136 B1 | * 3/2001 | Shteyn | 710/129 |
| 6,219,409 B1 | * 4/2001 | Smith et al. | 379/106.09 |

FOREIGN PATENT DOCUMENTS

| | | |
|---|---|---|
| EP | 361993 B2 | 8/1993 |
| EP | 466152 B1 | 11/1994 |
| EP | 574636 B1 | 8/1996 |

* cited by examiner

Primary Examiner—Sumati Lefkowitz
(74) Attorney, Agent, or Firm—Conley, Rose & Tayon, P.C.

(57) ABSTRACT

A method and system of interchassis and intrachassis computer component command and control. The existing power rail is used for network connectivity for intrachassis command and control. An existing common power mains can be used for interchassis command and control. Further, a protocol, for example, the Consumer Electronic Bus (CEBus) protocol (or a CEBus protocol modified for the particular power rail) can be used to provide interchassis and intrachassis platform management functionality. This management functionality is similar to that provided by the proposed Intelligent Platform Management Interface (IPMI) specification. A chassis bridge controller is used to interface the intrachassis power rail command and control infrastructure to an exterior network. External systems (interchassis communications) can communicate to the bridge via the particular protocol over an existing common power mains as a secondary channel exterior network. However, the management functionality is implemented intrachassis, that is, it is applied to the internal components of the machine.

34 Claims, 7 Drawing Sheets

METHOD AND APPARATUS FOR PROVIDING INTERCHASSIS COMMUNICATION AND MANAGEMENT

The present invention relates to data communications and particularly to data communication between components in a computer chassis across a network.

BACKGROUND AND SUMMARY OF THE INVENTION

Presently, there are different types of data transmission systems employing existing cabled networks, or board level component traces specifically installed for that purpose. Such systems allow the automatic control and monitoring, at a distance, of components connected to the network.

These known systems generally allow a network or hardware administrator to respond to exigencies in the matter of monitoring and control of a network and its nodes. However, they exhibit a complex structure employing several individual control and monitoring modules managed by a single or several collective control modules, themselves possibly managed by a central module.

Background: Compatibility

Over the years, communications technology has developed for the computer industry into what is now extensive sophistication in hardware and software systems for facilitating various types of communications. Nevertheless, extensive sophistication and advancements in many hardware and software systems can be thwarted from market or commercial applicability for many reasons. For example, if a new communications system is not compatible with an existing system, many users will not purchase the new system. Attempts for a single manufacturer to become the system to which all others must be compatible can be quite difficult to achieve and, even if successful, cost the manufacturer a great deal of investment capital. Attempts for different manufacturers to interface with each other often creates complex and expensive systems which can confuse system purchasers and installers alike, and can often making the problems worse. Also, manufacturers of systems are reluctant to develop or introduce new systems to the market when compatibility and user confusion are such big issues. Accordingly, compatibility with other existing or even future systems has been emphasized in various industries. Industry standards to accomplish compatibility goals of the data communication systems have resulted.

Despite the advancements of compatibility which result when particular industries adopt standards, another problem arises when an industry desires to change or make a transition to new standards. These new standards, for example can often provide higher speed capabilities or other significant improvements over previous standards. The new standards, however, often are not adopted because the new standard is not compatible with the existing standard. In other words, the market will not accept or is reluctant to accept, the new standard because it may require replacement of all existing systems with which the user wants to communicate. This can cause technology stagnation and inhibit rapid advancement of technology.

Background: Home Automation Standards

Home automation systems have long used special techniques for local communication over power mains. This was originally necessitated by the absence of any other type of bus over which "smart" devices could "talk" to each other. However, communication over power mains also introduces very specific problems, including those of line noise received from motors and other devices attached to the power mains, the need to ensure that the data itself does not interfere with other devices connected to the mains, and limited bandwidth. For similar reasons, low-bandwidth power-mains communications have also been used for limited data communications between smart devices and local electric utility control systems.

One example of an industry standard for building or home automation data communication systems has been the X10 or X-10 communications protocol for remote control of electrical devices which communicate across standard wiring or power lines of a building such as a home. (In general, methods of ensuring the accuracy of transmitted and received data are known as communications protocols.) The X10 communications protocol allows various home electronic devices, such as lighting controllers or switches, status indicators, security systems, telephone interfaces, computer interfaces, and various home appliances, to readily be linked together for simple control applications. The X10 communications protocol generally has a narrow bandwidth, i.e., 120 KiloHertz ("KHz"), for communicating data at a relatively slow speed, i.e., 60 bits/second.

Another industry standard for home automation has been the Consumer Electronic Bus ("CEBus") standard, which describes a local communications and control network designed specifically for the home. Like X10, the CEBus standard provides a standardized communication facility for exchange of control information and data among various devices and services in the home, such as lighting controllers or switches, status indicators, security systems, telephone interfaces, computer interfaces, stereo systems, and home appliances. The CEBus standard was developed by the Consumer Electronics. Group of the Electronic Industries Association ("EIA") and an inter-industry committee of representatives from both EIA and non-member companies. The CEBus standard generally has a wide bandwidth, e.g. 100–400 KHz, for communicating data at a relatively fast speed, i.e., 10 Kilobits/second and is significantly faster and more reliable than the X10 communications protocol. The CEBus standard also allows full networking of consumer application devices. The CEBus standard encompasses both the physical media (wires, fiber, etc.) and the protocol (software) used to create an intelligent home or office.

The newest standard for home automation is the EIA-600 standard, which is intended to handle existing and anticipated control communication requirements at minimum practical costs consistent with a broad spectrum of residential applications. It is intended for such functions as remote control, status indication, remote instrumentation, energy management, security systems, entertainment device coordination, etc. These situations require economical connection to a shared local communication network carrying relatively short digital messages.

Background: Platform Management

Presently, there are different types of data transmission systems which allow computer network components to be automatically controlled and monitored at a distance. These known systems are generally connected by a dedicated network, and consist of individual control and monitoring modules at each node, which are in turn managed by a central system.

The Intelligent Platform Management Interface (or "IPMI") specification was announced by Intel, Dell, Hewlett-Packard Company, and NEC to provide a standard interface to hardware used for monitoring a server's physical characteristics, such as temperature, voltage, fans, power supplies and chassis.

The IPMI specification defines a common interface and message-based protocol for accessing platform management hardware. IPMI is comprised of three specifications: Intelligent Platform Management Interface, Intelligent Platform Management Bus (IPMB) and Intelligent Chassis Management Bus (ICMB). The IPMI specification defines the interface to platform management hardware, the IPMB specification defines the internal Intelligent Platform Management Bus, and the ICMB specification defines the external Intelligent Chassis Management Bus, an external bus for connecting additional IPMI-enabled systems.

IPMI provides access to platform management information. IPMI-enabled servers monitor and store platform management information in a common format which can be easily accessed by server management software, add-in devices or even directly from other servers.

A management bus, IPMB, allows add-in devices such as Emergency Management Cards to access platform management information, even if the processor is down. The IPMB can also be extended externally to the chassis (ICMB) to enable "system-to-system" monitoring. This allows a server to manage another ICMB-connected server even if it has no system management software or the processor is down.

Functions such as failure alerting, power control and access to failure logs are supported for systems connected to the ICMB, so multiple servers or peripheral chassis (storage and power supplies) can connect to the ICMB as an alternative to using Emergency Management Cards.

IPMI allows differentiated hardware solutions to be implemented quickly and easily. The IPMI interface isolates server management software from hardware, enabling hardware changes to be made without impacting the software. Although IPMI is not tied to a specific operating system or management application, it is complementary to higher level management software interfaces such as the Simple Network Management Protocol (SNMP), Desktop Management Interface (DMI), Common Information Model (CIM), and Windows Management Interface (WMI), which facilitate the development of cross platform solutions.

IPMI allows system managers to determine the health of their server hardware, whether the server is running normally or is in a nonoperational state. Servers based on IPMI use "intelligent" or autonomous hardware that remains operational even when the processor is down so that platform management information is always accessible. The IPMI interfaces enable platform management hardware to be accessed not only by management software but also accessed by third party emergency management add-in cards and even other IPMI-enabled servers. System-to-system monitoring or management via a connected server is becoming increasingly important as system managers deploy complex system topologies such as clusters and rack-mounted configurations. In addition, the scalable nature of IPMI enables the architecture to be deployed across a server product line, from entry to high-end servers, and gives system managers a consistent base of platform management functionality upon which to effectively manage their servers. One specific disadvantage of this approach is that additional physical connections and device support is required to interconnect these components.

Background: Microprocessor Support Chipsets

The CPU normally requires a number of support chips to handle buffering of data from memory, interfacing to legacy architectures, and caching and bus arbitration. These functions are managed by custom-designed chipsets which perform a "bridging" function. More specifically, a bridging device may provide a connection between two independent buses.

FIG. 6 shows a typical design where bridging occurs between the host processor bus 622 and the PCI bus 604, between the PCI bus 604 and a standard expansion bus 606 (such as ISA or EISA), and between host bus 602 and PCI bus 604. For example, a host/PCI bridge 608 may take various actions based upon an action initiated by the CPU 626; if the CPU is performing a main memory read/write, the bridge 608 takes no action; if the CPU is targeting a device memory located on a bus behind the bridge, the bridge 608 must act as a surrogate target of the CPU's transaction; if the CPU 626 accesses a PCI device configuration register, the bridge 608 must compare the target bus to the range of PCI buses that exist beyond the bridge, and initiate a transaction message based upon the location of the targeted bus. This particular rendition shows a multiprocessor implementation using two processors, 626 and 628.

Interchassis Communication and Management

The present application discloses a method and system of interchassis and intrachassis computer component command and control. The existing power rail is used for network connectivity for intrachassis command and control. An existing common power mains can be used for interchassis command and control. Further, a protocol, for example, the CEBus protocol (or a CEBus protocol modified for the particular power rail) can be used to provide interchassis and intrachassis platform management functionality. This management functionality is similar to that provided by the proposed IPMI specification. A chassis bridge controller is necessary to interface the intrachassis power rail command and control infrastructure with an exterior network. External systems (interchassis communications) can communicate to the bridge via the particular protocol over an existing common power mains as a secondary channel exterior network. However, the management functionality is implemented intrachassis, that is, it is applied to the internal components of the machine.

An advantage of the present disclosure is that a loosely coupled secondary network can be constructed without the need for new cable. This secondary network can be accessed even when the primary network is down. The use of the existing common power mains allows for easy scalability.

Another advantage of the present disclosure is that it eliminates the cost that would be incurred by building a secondary network for command and control information.

Another advantage of the present disclosure is that the burden of the external cables of a secondary network between systems is avoided. This elimination of a second set of network cables eliminates the possibility of undesirable effects such as, EMI, safety issues, and cable management

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

Figure 1:
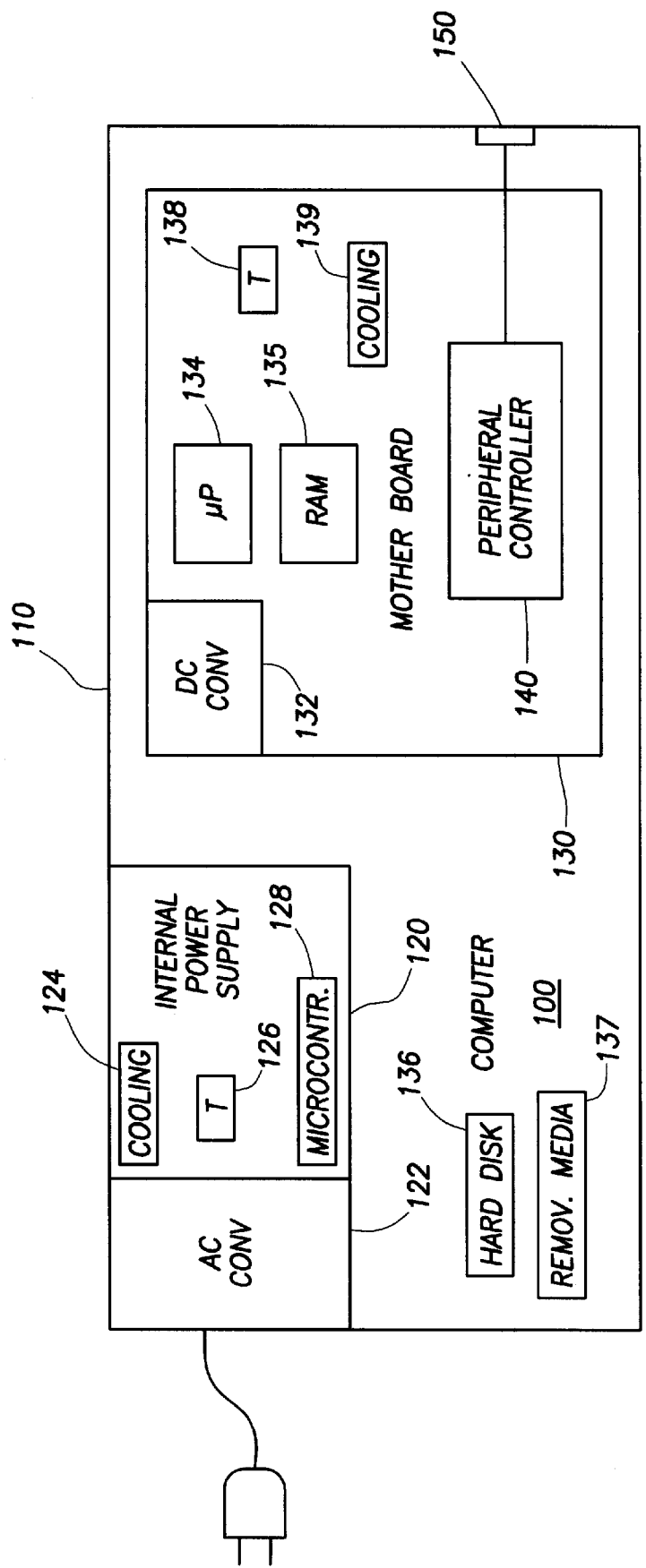
FIG. 1 shows a sample electrical configuration of some important parts of a computer according to the preferred embodiment.

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

This application shares some text and figures with the following US applications, which all have an effective filing date simultaneous with that of the present application and hereby incorporated by reference: application Ser. Nos. 09/280,314, 09/293,587 and 09/280,311.

Definitions

Following are short definitions of the usual meanings of some of the technical terms which are used in the present application. (However, those of ordinary skill will recognize whether the context requires a different meaning.) Additional definitions can be found in the standard technical dictionaries and journals.

X-10 is the oldest and most widely-used home automation protocol. It uses the power lines as a transmission medium. LonWorks Echelon Corporation developed this standard for both home and industrial use, and the standard may be obtained from that company. LonWorks uses a variety of transmission media including IR, RF, coaxial cable, and twisted pair.

IEEE 1394 is a communications standard which supports real-time audio and video transmission with data rates up to 400 Megabits/sec. IEEE 1394 uses a cable consisting of three twisted pairs to connect devices in a network. The IEEE 1394 standard, which is hereby incorporated by reference, is published by, and available from, the IEEE.

CEBus is a newer standard in home automation. Like LonWorks, CEBus uses a variety of transmission media including IR, RF, coaxial cable, and twisted pair. The CEBus standard, which is hereby incorporated by reference, is published by, and available from, the Electronic Industries Association.

USB (or the Universal Serial Bus) was originally intended for use as a home automation protocol. However, it was actually developed as a protocol for computer peripherals by several manufacturers of personal computer products. The USB specification is available, as of the filing date of this application, from the USB Implementer's Forum at http://www.usb.org, and is hereby incorporated by reference.

Power rail refers to any one of the connections which provide power to each of the internal system components of a computer system. The power rail generally receives power from the system power supply, which itself is powered by a battery or an external power source.

Power mains refers to the power mains systems in common use in all industrialized countries. In the United States, for example, this would refer to the common indoor power outlets which supply current at 60 Hz and (for most circuits) about 120V; in the U.K. this would refer to the common indoor power outlets which supply current at 50 Hz and 240V.

Intrachassis refers to components of a computer system connected to a common power rail and, typically, located within a common system unit. In the context of this application, "intrachassis" includes system devices that may be physically located outside the system unit bus, but which are still powered by the common power rail, e.g., an external hard drive.

Intrachassis and Interchassis Communication

According to the preferred embodiment, a network of computer systems is provided in which various "smart" devices within each system are capable of communicating with each other over the system power rail, and between devices on different computer systems over a common power mains.

Description of Exemplary Node

FIG. 1 shows a sample electrical configuration of some important parts of a computer 100. The case 110 encloses the motherboard 130 and power supply 120, as well as other components, such as a hard disk drive 136, a removable media drive 137, and many other possible components, not shown, such as an I/O channel interfaces, and option cards if present. The motherboard 130 includes many key components of the computer. For example, the motherboard carries one or more microprocessors (or other processing units) 134, RAM 135, and a peripheral controller 140, as well as many others which are not shown. Also mounted on the motherboard may be a temperature sensor 138 or cooling device 139, for example, a fan.

The power supply 120 preferably includes an AC connection 122, which permits power to be drawn from an AC power line, and provides power to a DC connector 132 on the motherboard. Further, the power supply preferably includes a cooling device 124 (a fan, for example) and a temperature sensor 126.

According to the preferred embodiment, the power supply incorporates a microcontroller 128 and non-volatile memory for storing a boot-up program, which is connected to the system power rail, and is capable of communicating with other devices incorporating similar microcontrollers, for example, the peripheral controller 140, over the power rail. According to the preferred embodiment, this communication is done according to the CEBus specification or a modification thereof, described above.

The exemplary functions below will be described with particular reference to the microcontroller 228 of the power supply, but it will be understood by those skilled in the art that the similar controllers in other system devices will function and communicate similarly. Moreover, when reference is made to any specific component communicating with another over the power rail, it will be understood that this is accomplished by use of the respective microcontrollers of those components.

In this embodiment, various system devices, including the temperature sensor 138, the cooling device 139, and the hard disk drive 136, are connected to send and receive signals over the power rail. In this manner, the controller 128 in the power supply can communicate with these system devices. Further, the system peripheral controller can be connected to communicate over the power rail.

Particular communications supported by the controller 128 include the ability to request basic status information from each device, and to command the devices to power on or off as needed. For example, the controller 128 may receive information from temperature sensor 138 indicating a high temperature, and may command cooling device 139 to turn on or adjust speed in response. An exemplary command/data format is described below.

Further, each system device has an associated identifier address which uniquely identifies that device within the system. The identifier functions to specifically identify both the type of device and the specific address of that device within devices of that type. This identifier is used to specifically identify the sender and recipient of any data or command sent over the system power rail.

This identifier is particularly advantageous when used to determine which device types are authorized to perform certain functions or to send certain commands. For example, while it may be useful for a temperature sensor, upon detection of an overheating condition, to order the power supply to shut the system down, there is almost no reason for a hard disk drive to request a system shut-down or go into a low-power mode. By identifying the class of device from which a command is sent, the receiver can determine whether or not to respond.

Figure 2:
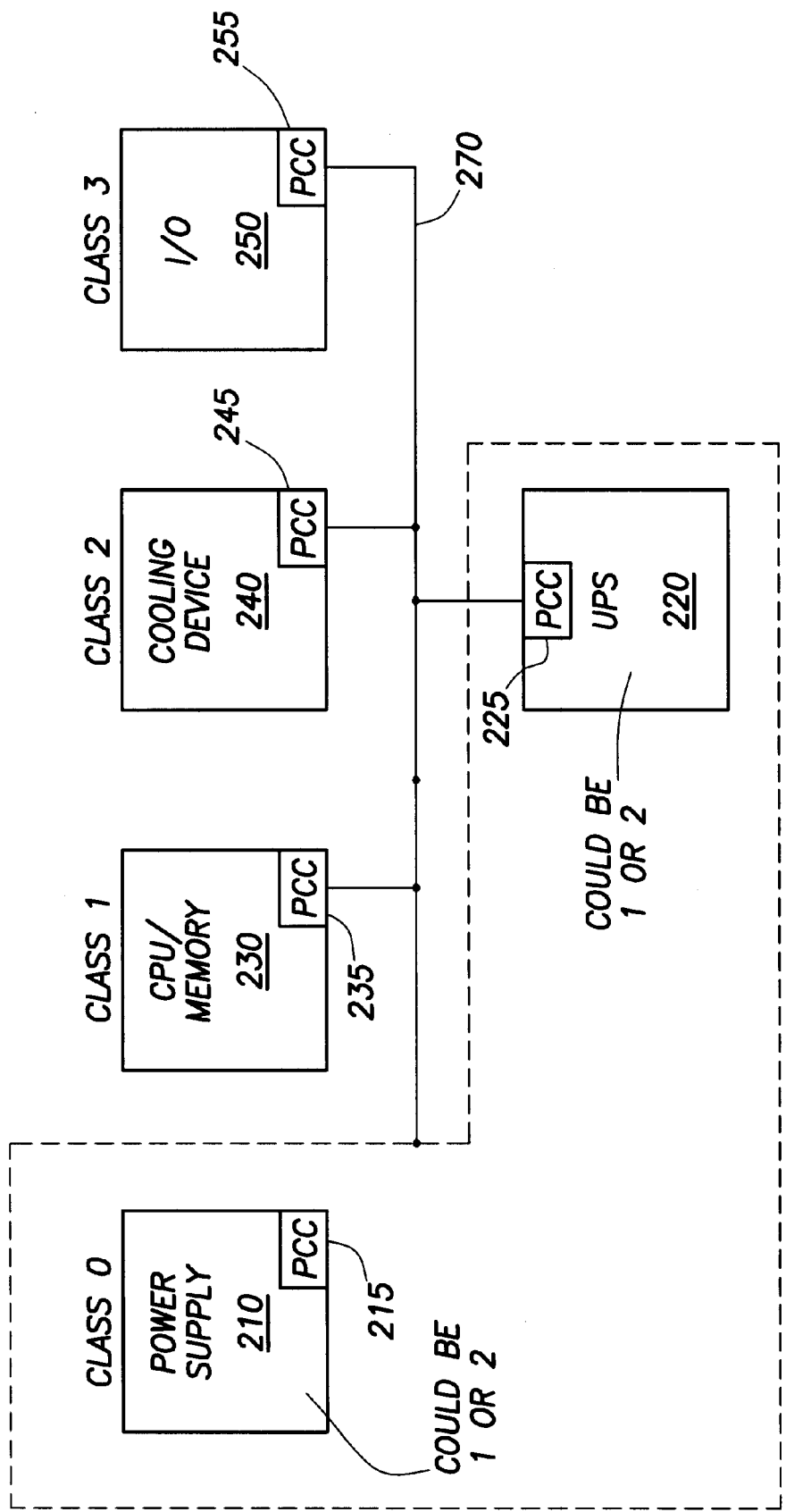
FIG. 2 shows a block diagram of an exemplary computer system according to the preferred embodiment, with system devices divided into different classes.

FIG. 2 shows a block diagram of an exemplary computer system according to the preferred embodiment, with system devices divided into different classes. In this diagram, each device shown incorporates a respective power communications controller (PCC), which communicates over power rail 270. In this example, power supply 210 includes PCC 215 and is designated Class 0. Uninterruptible Power Supply (UPS) 220, which includes PCC 225, may optionally be a unit distinct from the power supply 210, or they may be integrated together, as indicated by the broken box. In this example, Class 1 includes CPU/memory system 230 and PCC 235. Class 2 includes cooling device 240, for example, a fan, and PCC 245. Class 3 includes I/O device 250 and PCC 255. All devices are connected, through their respective PCCs, to power rail 270.

Figure 3:
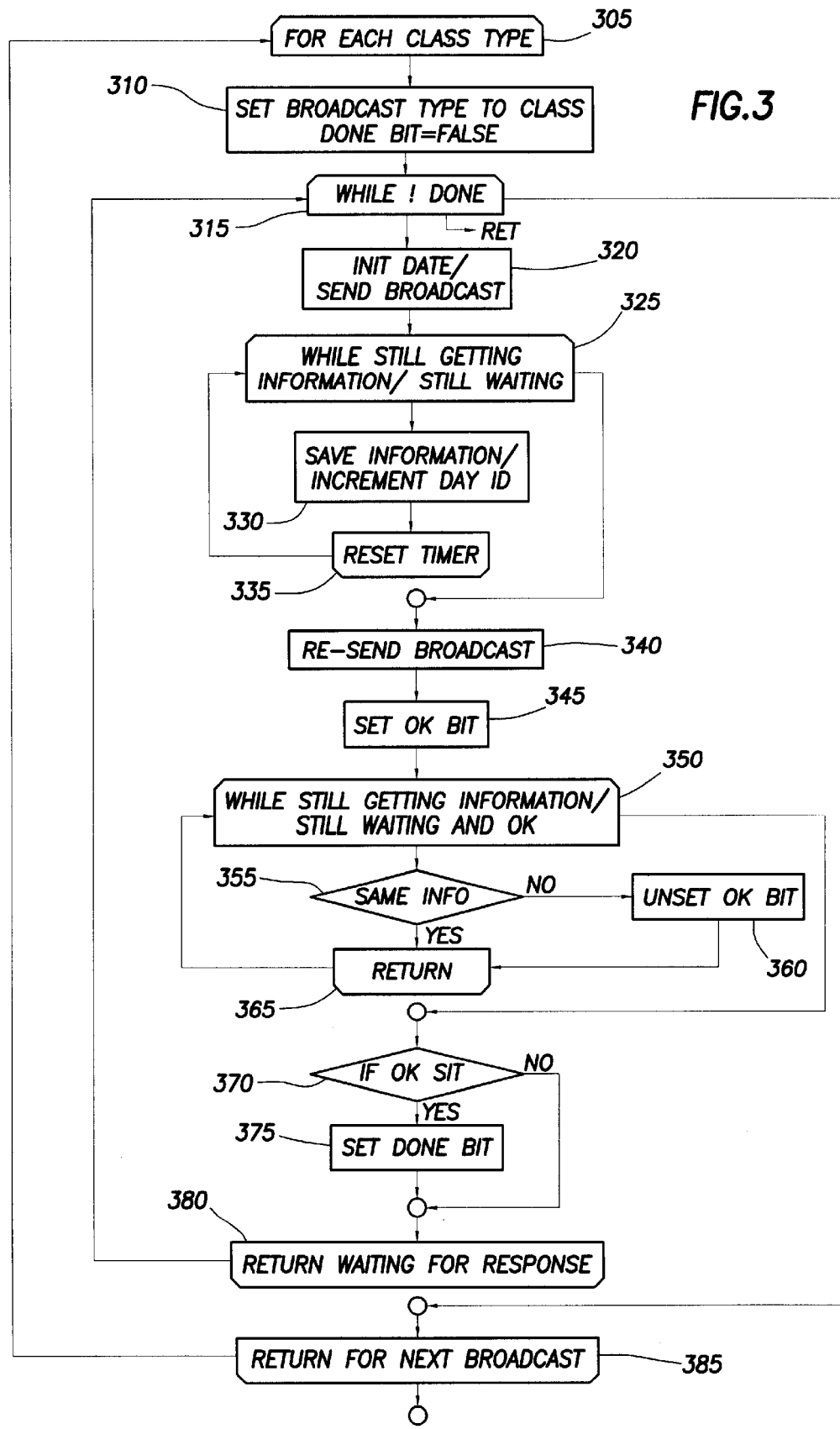
FIG. 3 shows a flow chart of a process according to the preferred embodiment.

FIG. 3 shows a flow chart of a class-based broadcast process according to the preferred embodiment. In this chart, when a command or request is sent to a certain class of device (step 305), the broadcast type is set to "class" and the "DONE" bit is cleared (step 310). Then, as long as the DONE bit remains clear (step 315), a repeated broadcast/verify routine is performed.

First, the broadcast is initialized and sending is initiated (step 320). Then, as long as ACKs are received from devices that have received the broadcast (step 325), the broadcast process continues to wait, saving the list of responding devices as the acknowledgments are received (step 330). As each ACK is received, a delay timer is reset, and the next ACK is waited on (step 335). If the timer expires without receiving another ACK, an assumption is made that the broadcast is done and the initial broadcast loop is left.

Next, the same broadcast is resent (step 340) and an OK bit is set to a default 1 (step 345). The process then waits for device responses as above (step 350, looping at step 365). As the process receives responses, as long as the responses are the same as those received earlier and saved in step 330 (step 355), the looping continues. If anything different is received, the OK bit is cleared (step 360). The process continues after all information is received.

The status of the OK bit (step 370) is checked. If it is set, the DONE bit is then set as well (step 375); if not, the DONE bit is left cleared. The process then loops back (step 380) to step 315. If the DONE bit is set, the routine is finished (step 385) and ready for the next broadcast (looping back to step 305). If the DONE bit is clear, the entire broadcast sequence is retried (looping back to step 315).

Figure 4A:
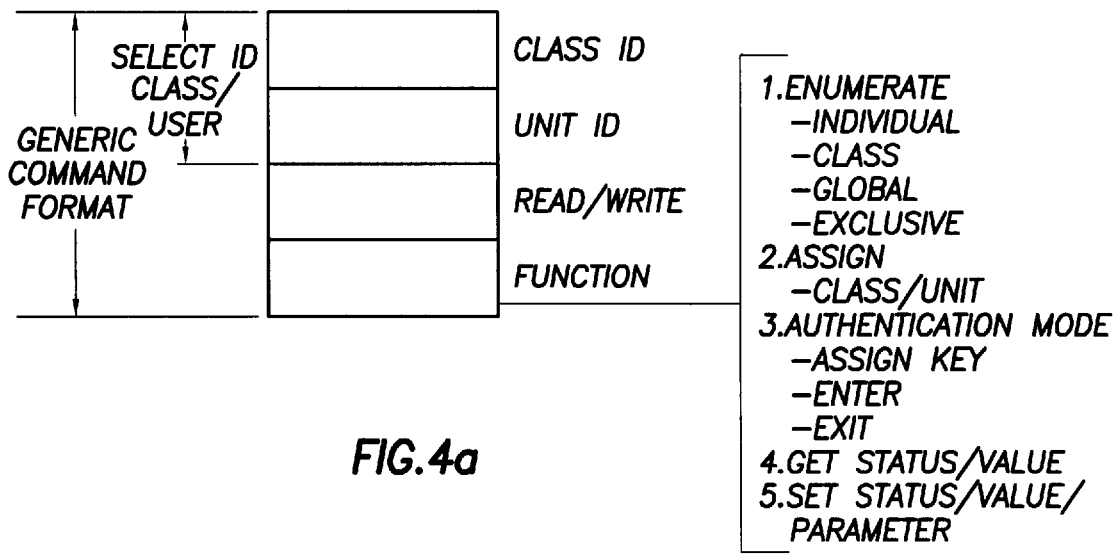
FIG. 4 shows the format of a data/instruction block according to the preferred embodiment.

FIG. 4 shows the format of two data/instruction blocks according to the preferred embodiment. FIG. 4a shows a generic command format. In this block, the select ID includes both the device class ID and the unit ID. Next in this block is a read/write bit, indicating the type of transmission. Finally, the function portion of the block indicates the function to be performed.

Typical functions of the preferred embodiment include enumeration, which could be specified for individual units, device classes, globally, or exclusively. An "assign" function would allow devices to be assigned specific class and unit IDs. An "exit" or "enter" function to change the authentication mode allows the device to be switched between authenticated and unauthenticated command, or to have the authentication key assigned or changed. A "Get Status/Value" function allows the device to be polled for its current status, e.g. the current speed of the cooling device or the current temperature of the system. Finally, a "Set Status/Value/Parameter" function allows the status of the device to be changed, e.g. changing the speed of a cooling device or powering down a hard drive.

Figure 4B:
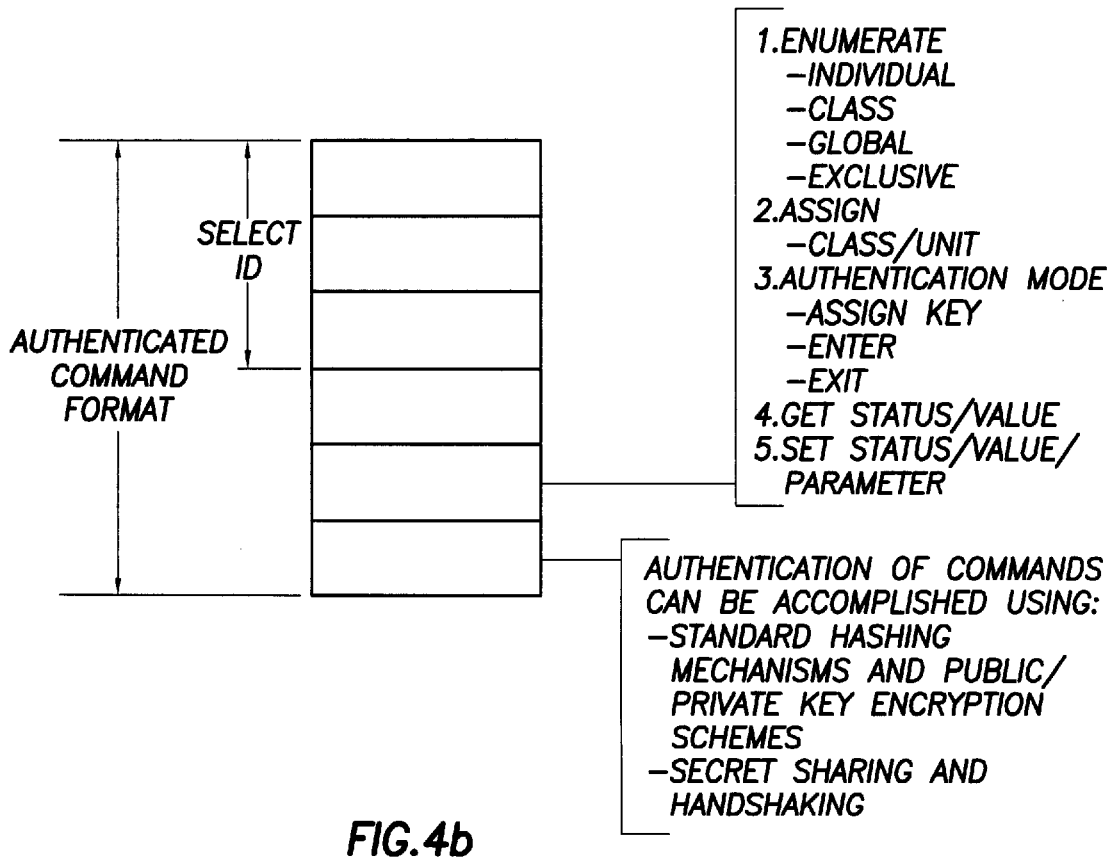

FIG. 4b shows an authenticated command format, which is the same as the generic command format with an additional field for authentication. This field contains an authentication code or key, and can support standard hashing mechanisms, public/private key encryption schemes, and secret sharing and handshaking.

Description of Network

Figure 5A:
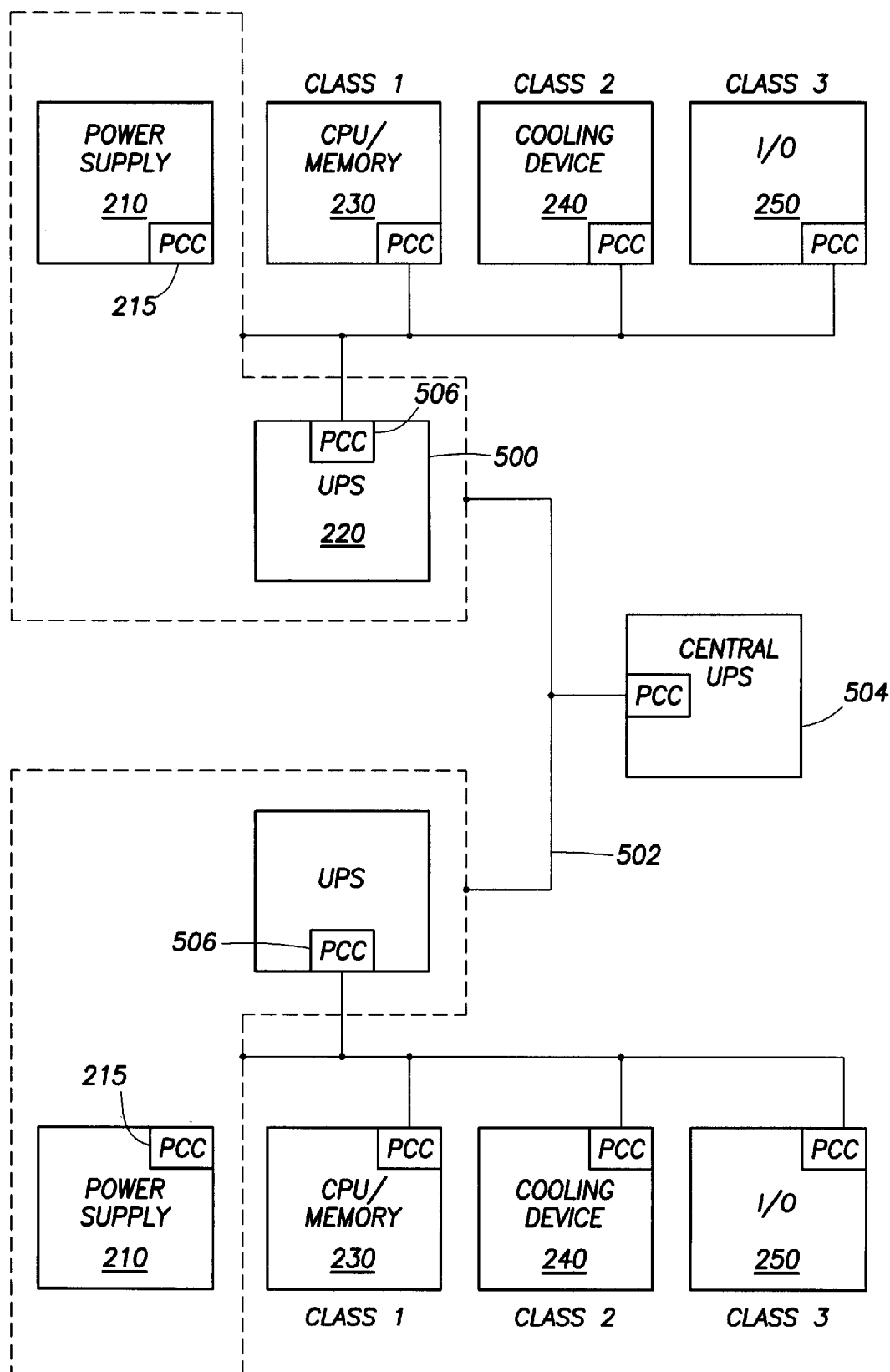
FIGS. 5A and 5B depict block diagrams of facilitating interchassis communication.
Figure 5B:
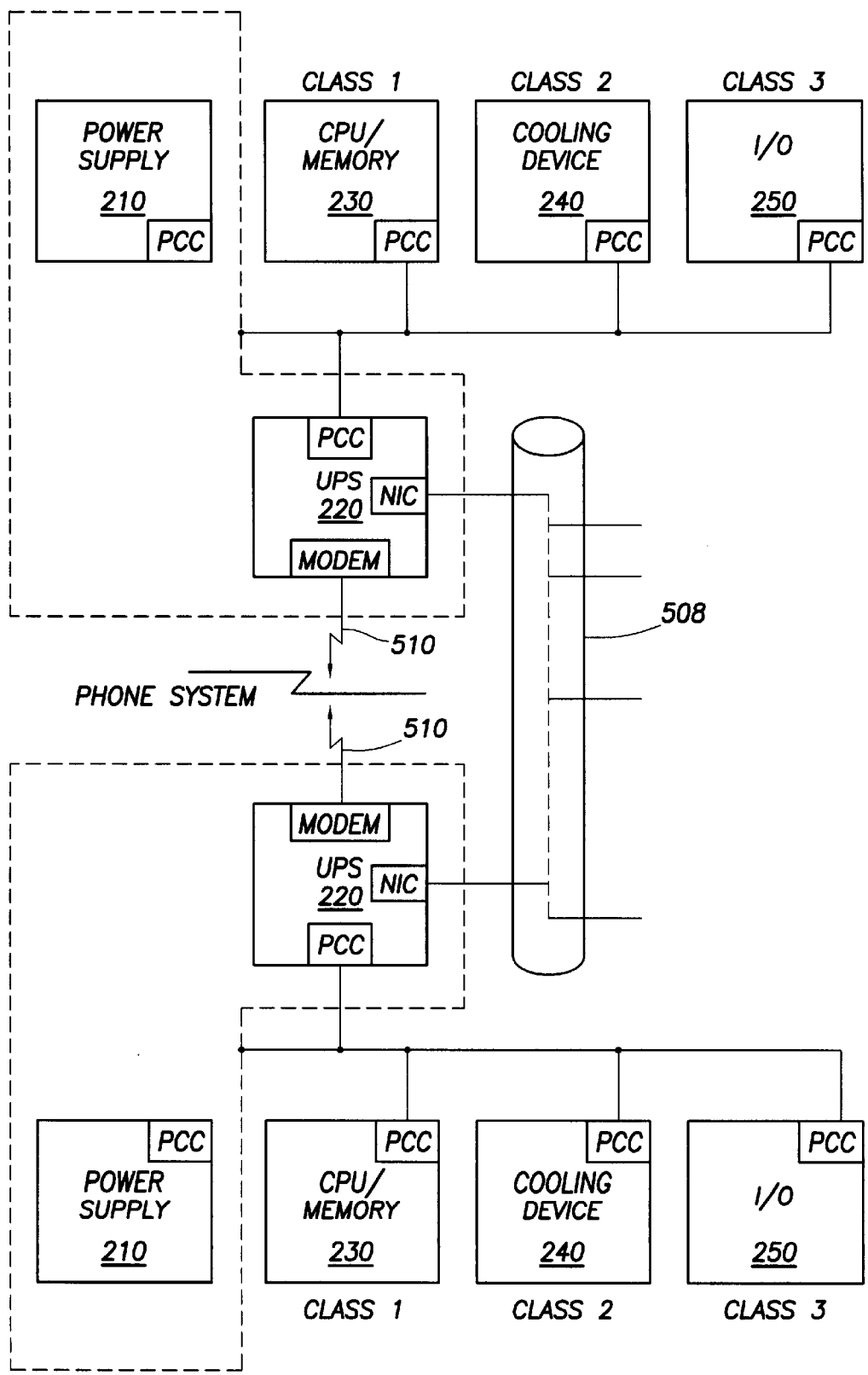
Figure 6:
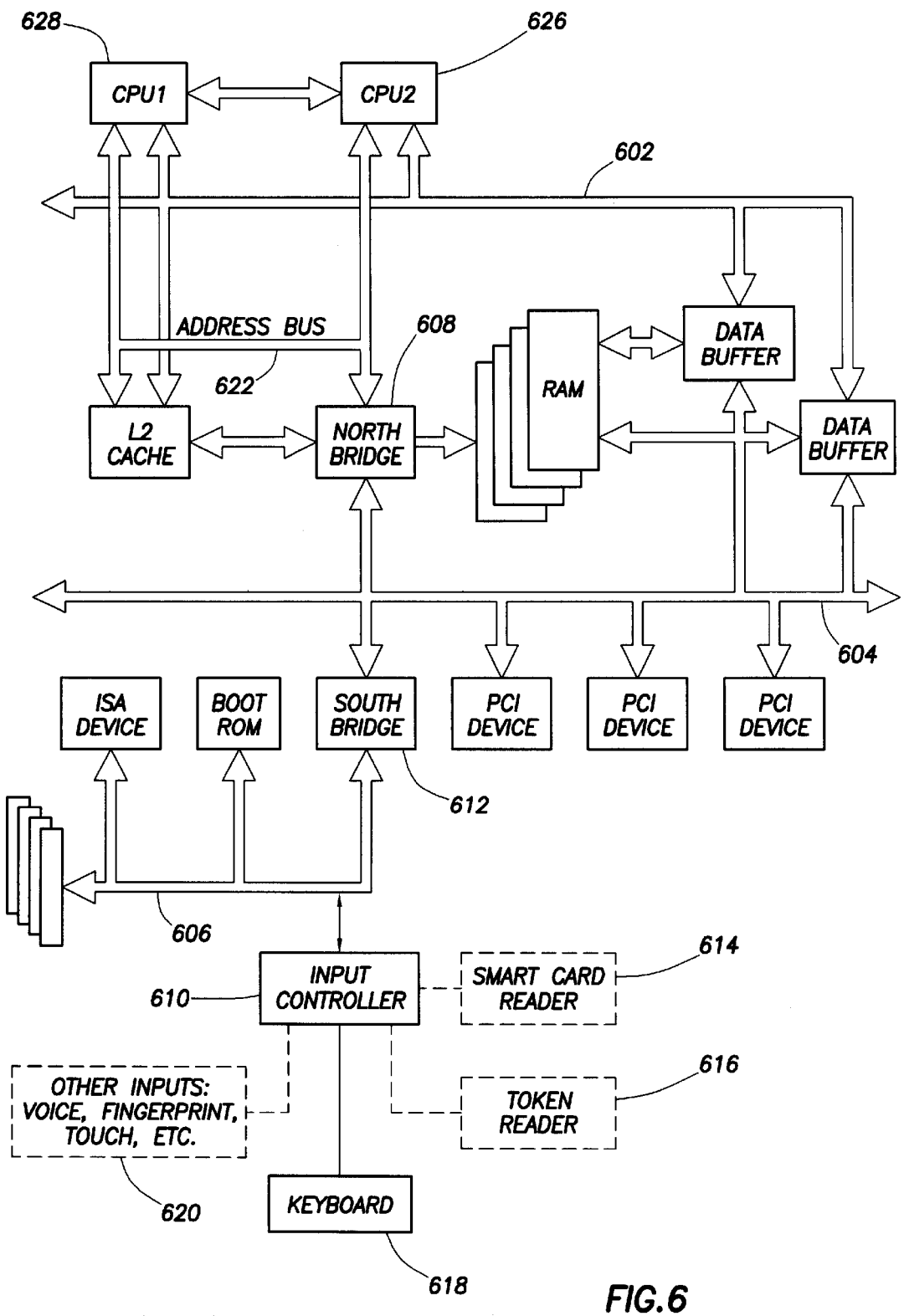
FIG. 6 shows a typical design where bridging occurs between the host processor bus 622 and the PCI bus 604, between the PCI bus 604 and a standard expansion bus 606 (such as ISA or EISA), and between host bus 602 and PCI bus 604.

FIGS. 5A and 5B depict block diagrams of a network facilitating interchassis communications. As described above, the preferred embodiment provides a network of nodes, wherein each node is preferably as described above. According to the preferred embodiment, each of the nodes can be linked over a common high speed network or networks, but is also configured to communicate over a common power mains. In FIG. 5A, each chassis is as described in FIG. 2. However, interchassis communication is facilitated by the use of the common power mains 502 as a means for each UPS 220 to communicate. Communication among UPSs 220 and a Central UPS 504 can take place. Therefore, the power mains itself serves as a secondary (or even tertiary) means of communication. Since the power supply of each node incorporates a PCC 215 and each UPS also incorporates a PCC 506 enabling communications over power systems, each node is capable of communicating with each other node over any common power mains. In addition, according to the preferred embodiment, the power supply PCC 215 in each node can act as a bridge to allow communications over the power mains to the individual devices on each node's power rail.

In FIG. 5B an external network 508 is depicted along with a loosely coupled network 510 created by a modem connection across an existing phone system. The phone system acts in the same way as the common power mains. It is capable of relaying command and control functions across existing common phone wires to other nodes on the network.

This system provides an advantage to systems in networks or in a loosely coupled system by utilizing the power mains as an additional command and control channel messaging mechanism. this mechanism is necessarily closely associated with the application of electrical power to any of the member nodes in a network. Therefore, further refinement of quorum validation routines is allowed in that loss of node power does not necessarily have the same symptoms to observing nodes as does loss of messaging via the primary command and control channels (the primary network).

One current methodology for quorum validation is to send messages to other nodes to obtain mutual consent on the agreed-upon list of network members. Loss of messaging between any nodes (or group of nodes) in a network is the cause for the remaining network nodes to attempt to obtain mutual consent on an agreed upon list of network members. The preferred embodiment provides a secondary command and control channel that is independent of the current network and is closely associated with the application of system power to a failed node. In general, if communications are lost over the power mains, the node has been removed from the power mains and is therefore down.

The innovative power mains secondary channel can be implemented using a variety of current protocols, including CE-Bus, X-10, LonWorks, Intelligent UPS communication protocols, and ICMB/IPMI. When a member of a quorum loses connectivity, a connected member of the quorum could communicate with the disconnected member via the power mains, or with objects closely associated with the power mains.

By using the preferred power mains secondary channel, surviving members can, for example, use the information in any of the following ways:

Soft power switches (i.e. the on/off generates a system management interrupt which signals the system to prepare for a power off) could be used to signal a critical time window in which other nodes attempt to re-arbitrate the quorum token object. This may or may not have operating system cooperation on the node being powered down;

If a node becomes unresponsive over the primary network communications channel, surviving nodes can force a power-cycle reset on the unresponsive note, by sending a "restart" command to that node's power supply. Given the much higher fault rate of system software than hardware, a power cycle reset is a very effective strategy for restoring a node to normal operation; and If a node becomes unreachable by both primary and secondary (power mains) communication channels, it has been removed from the power mains and will not be part of a rogue sub-network.

Intrachassis Communication

In the presently preferred embodiment, the components within each node of the secondary network communicate through the power rail of the node (intrachassis communication). The nodes of the secondary network communicate through the common power mains which exists in the facility in which the nodes operate (interchassis communication). For both types of communication, the CEBus protocol (or a modification to meet the specifics of the power rail network) can be used. A chassis bridge controller is used as an interface between the power rail of a node on the secondary network and the existing common power mains. In this manner components within a node can communicate with components within the other nodes of the network. Such communication allows the individual components of a node on the secondary network to be controlled by a central node (usually the systems manager). The systems manager can perform platform management type command and control function. These functions, in the presently preferred embodiment, are similar to those defined in the IPMI specification.

According to a disclosed class of innovative embodiments, there is provided a computer system comprising at least one microprocessor; a power supply connected to provide power to said microprocessor from a power mains connection; a network interface through which said microprocessor can perform data communications at a first maximum data rate; and a power-line communication interface through which data communications can occur over said power mains connection, at a rate which is less than one percent of said first maximum data rate.

According to another disclosed class of innovative embodiments, there is provided a network of computer systems, comprising: a plurality of computer systems, each having a user input device, a microprocessor which is operatively connected to detect inputs from said input device, random-access memory which is connected to be read/write accessible by said microprocessor, one or more cooling devices, an output device operatively connected to receive outputs from said microprocessor, a power supply connected to draw power from a mains connection and to supply power through a power rail to said microprocessor, said memory, and said cooling devices; and a chassis bridge controller connected as a signal interface between said power rail and said power mains; and a high-speed network connecting said computer systems and allowing communication therebetween; wherein said computer systems are connected to said power mains system, and are capable of communicating therebetween over said power mains.

According to another disclosed class of innovative embodiments, there is provided a system of hardware management in a computer system, comprising: computer system components connected to a power rail, including a user input device, a microprocessor which is operatively connected to detect inputs from said input device, random-access memory which is connected to be read/write accessible by said microprocessor, and an output device operatively connected to receive outputs from said microprocessor, non-volatile storage which is connected to be read/write accessible by said microprocessor and at least one cooling device; a power supply connected to said power rail and an external power source to provide power to said computer system components; and a chassis bridge controller connected as a signal interface between said components connected to said power rail and said external power source; wherein said power rail facilitates command and control communications between said computer system components and between said computer system components and said power supply.

According to another disclosed class of innovative embodiments, there is provided a method of hardware security management in a computer network, comprising: operating a plurality of computer systems connected to a high-speed network and to power mains; allowing communication between said computer systems across said network and also over said power mains; and using a chassis bridge controller to facilitate communications between the components of said computer systems and said plurality of computer systems.

According to another disclosed class of innovative embodiments, there is provided a method of hardware management, comprising the steps of: operating a computer system with components connected to a power rail and a power supply connected to said power rail and an external power source to provide power to said components and a chassis bridge controller connected to as a signal interface between said power rail and said external power source; using said power rail to facilitate command and control communications between said components and between said components and said power supply; and using said chassis bridge controller to facilitate communications between said components and power supply and other components external to said computer system.

Modifications and Variations

As w ill be recognized by those skilled in the art, the innovative concepts described in the present application can be modified and varied over a tremendous range of applications, and accordingly the scope of patented subject matter is not limited by any of the specific exemplary teachings given.

In one contemplated alternative, an Uninterruptable Power Supply (UPS) unit can be configured to provide a bridge from power-mains communication (as described above) to a phone line connection or a network interface card (NIC).

In the sample computer system embodiment the user input devices can alternatively include a trackball, a joystick, a 3D position sensor, voice recognition inputs, or other inputs. Similarly, the output devices can optionally include speakers, a display (or merely a display driver), a modem, or other outputs.

The presently preferred embodiment of this disclosure relies on the CEBus protocol or a modification thereof. However, it is possible that other currently existing protocols, for example, X-10, can be used to achieve substantially similar results. It is also possible that a faster protocol could be developed which can take advantage of the disclosed methods and apparatus.

A secondary network utilizing power mains connectivity is described for the presently preferred embodiment. The topology of this power mains network can vary according to the wiring of the facility or facilities in which it is used. The power mains network, for example, can be hub and spoke, daisy chained, or some other connectivity scheme. In addition, the scope of the network need not be limited to a particular room, circuit, power mains junction box, or building installation. Instead, the service area of the present embodiment extends at least to the detectability distance of the command and control signals. Further, it is possible that the command and control signals can be boosted to increase the service area of the secondary network.

In the presently preferred embodiment, the command and control signals are described as functions implemented in the IPMI platform. However, a modification of the existing IPMI platform, functions from another management platform, a new set of functions, or some combination of functions and platforms can be utilized by the presently preferred embodiment.

Additional general background, which helps to show the knowledge of those skilled in the art regarding the system context, and of variations and options for implementations, may be found in the following publications, all of which are hereby incorporated by reference. In particular, many details may be found in the books from MindShare, Inc., including PROTECTED MODE SOFTWARE ARCHITECTURE, CARDBUS SYSTEM ARCHITECTURE, EISA SYSTEM ARCHITECTURE, ISA SYSTEM ARCHITECTURE, 80486 SYSTEM ARCHITECTURE, PENTIUM PROCESSOR SYSTEM ARCHITECTURE, PCMCIA SYSTEM ARCHITECTURE, PLUG AND PLAY SYSTEM ARCHITECTURE, PCI SYSTEM ARCHITECTURE, USB SYSTEM ARCHITECTURE, and PENTIUM PRO PROCESSOR SYSTEM ARCHITECTURE, all of which are hereby incorporated by reference, and in the PENTIUM PROCESSOR FAMILY DEVELOPER'S MANUAL 1997, the MULTIPROCESSOR SPECIFICATION (1997), the INTEL ARCHITECTURE OPTIMIZATIONS MANUAL, the INTEL ARCHITECTURE SOFTWARE DEVELOPER'S MANUAL, the PERIPHERAL COMPONENTS 1996 databook, the PENTIUM PRO PROCESSOR BIOS WRITER'S GUIDE (version 2.0, 1996), and the PENTIUM PRO FAMILY DEVELOPER'S MANUALS from Intel, all of which are hereby incorporated by reference.

What is claimed is:

1. A computer system comprising:
   at least one microprocessor;
   a power supply connected to provide power to said microprocessor from a power mains connection;
   a network interface through which said microprocessor can perform data communications with an external device; and
   a power-line communication interface through which data communications can occur over said power mains connections with said external device.

2. The system of claim 1, wherein commands received over said power main connections can initiate a system reset.

3. The system of claim 1, wherein commands received over said power main connections can initiate a reset of said network interface.

4. The system of claim 1, wherein said data communications over said power-line communication interface use a modified Consummer Electronic Bus (CEBus) protocol.

5. A network of computer systems, comprising:
   a plurality of computer systems, each having
      a user input device, a microprocessor which is operatively connected to detect inputs from said input device, random-access memory which is connected to be read/write accessible by said microprocessor, one or more cooling devices, an output device operatively connected to receive outputs from said microprocessor,
      a power supply connected to draw power from a mains connection and to supply power through a power rail to said microprocessor, said memory, and said cooling devices; and
      a chassis bridge controller connected as a signal interface between said power rail and said power mains; and
   a high-speed network connecting said computer systems and allowing communication therebetween;
   wherein said computer systems are connected to said power mains system, and are capable of communicating therebetween over said power mains.

6. The network of claim 5, wherein one of said plurality of computer systems generates said command and control signals to communicate with others of said plurality of computer systems.

7. The network of claim 5, wherein said power mains system comprises a secondary network.

8. The network of claim 5, wherein said power mains system comprises a secondary network and said high-speed network communicates at a speed which is at least 10 times that of said secondary network.

9. The network of claim 5, wherein said communications take place utilizing the Consummer Electronic Bus (CEBus) protocol.

10. The network of claim 5, wherein said communications take place utilizing a modified Consummer Electronic Bus (CEBus) protocol.

11. The network of claim 5, wherein said command and control functions are network management functions as defined by the Intelligent Platform Management Interface (IPMI) specification.

12. The network of claim 5, wherein said command and control functions can control the operating status of said cooling device.

13. A system of hardware management in a computer system, comprising:
  computer system components connected to a power rail, including a user input device, a microprocessor which is operatively connected to detect inputs from said input device, random-access memory which is connected to be read/write accessible by said microprocessor, and an output device operatively connected to receive outputs from said microprocessor, non-volatile storage which is connected to be read/write accessible by said microprocessor and at least one cooling device;
  a power supply connected to said power rail and an external power source to provide power to said computer system components; and
  a chassis bridge controller connected as a signal interface between said components connected to said power rail and said external power source;
  wherein said power rail facilitates command and control communications between said computer system components and between said computer system components and said power supply; and
  wherein said chassis bridge controller facilitates passing commands between said components and an external device over said external power source.

14. The system according to claim 13, wherein said communications take place utilizing a modified Consummer Electronic Bus (CEBus) protocol.

15. The system according to claim 13, wherein said command and control functions are network management functions as defined by the Intelligent Platform Management Interface (IPMI) specification.

16. The system according to claim 13, wherein said command and control functions can control the operating status of said cooling device.

17. The system according to claim 13, wherein said external power source is a power mains.

18. The system according to claim 13, wherein said computer system components include an optical storage drive.

19. The system according to claim 13, wherein said computer system components include communications ports.

20. A method of hardware security management in a computer network, comprising:
  operating a plurality of computer systems connected to a high-speed network and to power mains;
  allowing communication between said computer systems across said network and also over said power mains; and
  using a chassis bridge controller to facilitate communications between the components of said computer systems and said plurality of computer systems.

21. The method of claim 20, wherein one of said plurality of computer systems generates said command and control signals to communicate with others of said plurality of computer systems.

22. The method of claim 20, wherein said power mains systems comprises a secondary network and said high-speed network communicates at a speed which is at least 10 times that of said communication over said power mains.

23. The method of claim 20, wherein said communications take place utilizing a modified Consummer Electronic Bus (CEBus) protocol.

24. The method of claim 20, wherein said command and control functions are network management functions as defined by the Intelligent Platform Management Interface (IPMI) specification.

25. A method of hardware security management in a computer network, comprising:
  operating a plurality of computer systems connected to a high-speed network and to power mains;
  allowing communication between said computer systems across said network at a first maximum data rate, and also over power mains at a second maximum data rate which is less than one one-hundredth of said first maximum data rate.

26. The method of claim 25, wherein said communication over power mains uses a modified Consummer Electronic Bus (CEBus) protocol.

27. A method of hardware management, comprising the steps of:
  operating a computer system with components connected to a power rail and a power supply connected to said power rail and an external power source to provide power to said components and a chassis bridge controller connected to as a signal interface between said power rail and said external power source;
  using said power rail to facilitate command and control communications between said components and between said components and said power supply; and
  using said chassis bridge controller to facilitate communications between said components and power supply and other components external to said computer system.

28. The method of claim 27, wherein said communications take place utilizing the Consummer Electronic Bus (CEBus) protocol.

29. The method of claim 27, wherein said communications take place utilizing a modified Consummer Electronic Bus (CEBus) protocol.

30. The method of claim 27, wherein said command and control functions are network management functions as defined by the Intelligent Platform Management Interface (IPMI) specification.

31. The method of claim 27, wherein said command and control functions can control the operating status of components.

32. The method of claim 27, wherein said external power source is AC power mains.

33. The method of claim 27, wherein said components include a microprocessor.

34. The method of claim 27, wherein said components include at least one cooling device.

* * * * *